No. 655,458. Patented Aug. 7, 1900.
H. SAXL.
METHOD OF MAKING SUPERPHOSPHATES.
(Application filed Dec. 26, 1899.)
(No Model.)
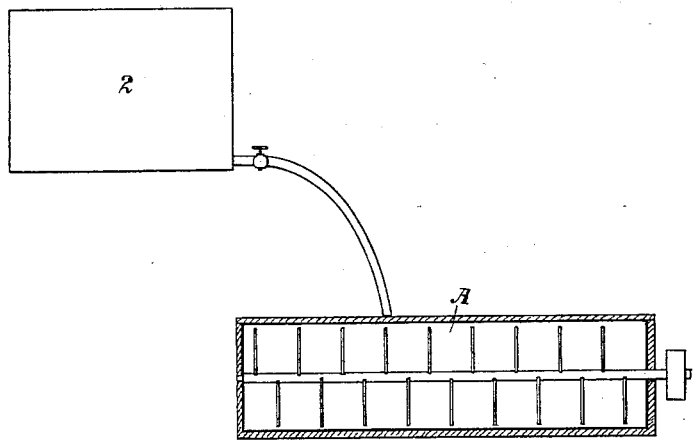
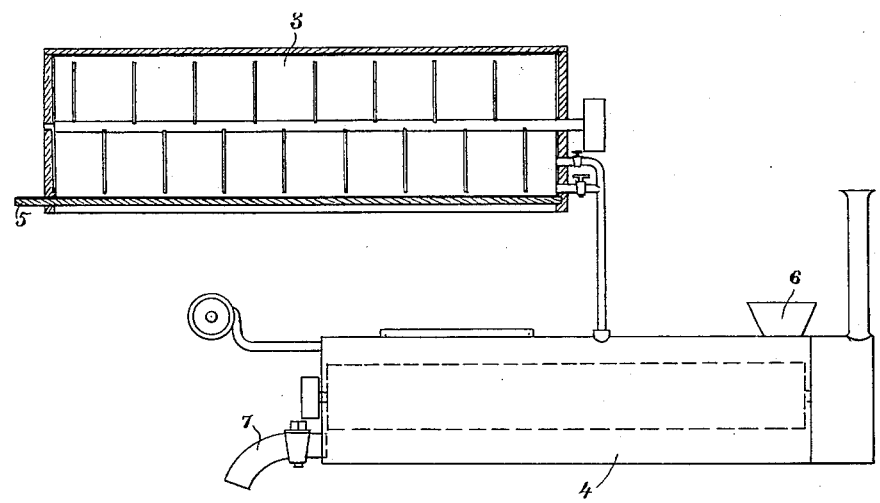
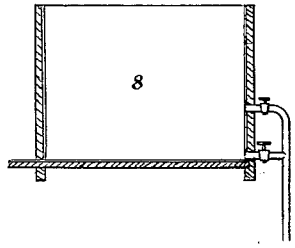
Witnesses,
Inventor,
Heinrich Saxl
By Dewey Strong & Co
Attys

UNITED STATES PATENT OFFICE.

HEINRICH SAXL, OF SAN FRANCISCO, CALIFORNIA, ASSIGNOR OF ONE-HALF TO AARON A. ADLER, OF SAME PLACE.

METHOD OF MAKING SUPERPHOSPHATES.

SPECIFICATION forming part of Letters Patent No. 655,458, dated August 7, 1900.

Application filed December 26, 1899. Serial No. 741,589. (No specimens.)

*To all whom it may concern:*

Be it known that I, HEINRICH SAXL, a subject of the Emperor of Austria-Hungary, residing in the city and county of San Francisco, State of California, have invented an Improvement in the Manufacture of Super-Phosphates; and I hereby declare the following to be a full, clear, and exact description of the same.

The object of this invention is to provide a concentrated easily-soluble phosphoric acid and the production of super-phosphates rich in fertilizing material.

It consists, essentially, in a process and treatment of super-phosphates as usually produced, whereby I am enabled to produce a product which is three or four times stronger and more concentrated than by the usual methods.

In preparing super-phosphates it is usually effected by mixing sulphuric acid with the raw product, such as bone, bone-meal, bone-ashes, spodium, also apatite, coprolite, and phosphorite, and generally natural phosphates which appear in lime-bearing rocks and the like, or any of the phosphates-of-lime and phosphoric-acid containing material. The sulphuric acid acts upon the material and disengages phosphoric acid, which in this state is easily soluble; but as the lime takes up a very considerable quantity of sulphuric acid it requires about an equal quantity, in weight, of the material and the sulphuric acid to produce the soluble phosphoric acid. Consequently as ordinarily produced only eighteen or twenty per cent. of easily-soluble phosphoric acid contained in the super-phosphate is the result.

The accompanying drawing illustrates a form of apparatus by which my process can be carried out.

In carrying out my process any raw product, such as previously mentioned, containing phosphate of lime is first ground or pulverized by a suitable mill (not here shown) and is then introduced into a mixer, a form of which is illustrated at A, consisting of an exterior tank or chamber with a rotary shaft and stirring-arms. 2 is a vessel containing sulphuric acid which may be of a strength of about 50° Baumé. The proportion of acid is about 1.60 of acid to one part of phosphate of lime. The acid and phosphate-of-lime-bearing material are stirred and agitated in the mixer A for a sufficient time and then removed and left upon a floor for from forty-eight to seventy-two hours or more, until the acid has had its full effect upon the mass. This separates the phosphoric acid from the material in which it was originally contained. After the mass has thus remained for a sufficient time it is placed in a second mixer 3, with about two parts of water to one of the material, and is there stirred for two or three hours, more or less, then allowed to settle, and the clear liquid can be drawn off into an evaporator, (shown at 4). This evaporator may be of any suitable well-known construction. (Not here shown.) The sulphate of lime remaining in the mixer 3 can be withdrawn by means of a movable bottom 5 or in any other suitable manner. Within the evaporator 4 the liquid is evaporated to about 20° Baumé, and I then add fifty per cent. of raw material. This may be conveniently introduced through a funnel, as shown at 6, or by any suitable means. The mixing of the fresh raw material with the concentrated acid already within the evaporator causes the separation of more phosphoric acid from the raw material, and this is united with the portion already in the apparatus. After this has been effected the mixture is drawn off through a suitable discharge 7 into a tank or receiver 8, where the heavier solid portion again settles, and the liquid is drawn off and again returned to the evaporator 4, where it is then evaporated to about eighty-five or ninety-five per cent. of strength. I then add about fifty per cent. of new material. This proportion will be variable because it depends entirely upon the percentage of phosphate of lime contained in the material, some grades having more than others. Any phosphoric acid which is still contained in the residue which has been withdrawn from the mixer 3 may be expressed or separated therefrom by filtering, centrifugal, or other well-known means. A certain amount of residue will be carried by the liquid which is withdrawn from the mixer 3, and while subjected to the heat of the evaporator is separated in the liquid, and when the whole is discharged from the evaporator into the settling apparatus (represented at 8) this residue will be settled and separated from the liquid. This residue may also be subjected to a similar process to that above described to deprive it of any valuable liquid which may remain in it. The liquid thus obtained can then be added to that which is in the evaporator 4. The remaining residue after all possible liquid has been separated therefrom may then be dried and mixed and will yield a good fertilizer in itself. If, however, it is not desirable to subject the residue from the mixing and settling apparatus 3 or 8 to the operation of separating the phosphoric acid contained in it, this residue will form a good high-grade super-phosphate by drying without further treatment.

It is to be understood that as many of the different forms of apparatus may be employed as will be necessary to enable the work to be carried on continuously.

One advantage gained by this operation is that by the use of the concentrated sulphuric acid in excess in the place of dilute sulphuric acid which has heretofore been used I avoid the formation of acid phosphate and obtain the greatest possible separation of the lime in the form of sulphate of lime. I am also enabled to almost entirely avoid leaching, and thereby the solution of gypsum, lime, and other foreign substances which would otherwise enter into the solution of phosphoric acid and prevent high concentration. In this process I save a large percentage of the sulphuric acid which has formerly been necessary, and it is the only described process of which I am aware in which phosphoric acid of from eighty-five to ninety-five per cent. can be produced and the resultant high-grade super-phosphate of from sixty-five to eighty-five per cent.

It will be understood that various forms of apparatus may be used in carrying out my invention. The liquid may be separated from the mass either by settling, as herein stated, or by filters, by air-pressure, centrifugal force, or any suitable or desired means, which I do not especially claim.

Having thus described by invention, what I claim as new, and desire to secure by Letters Patent, is—

1. In the manufacture of super-phosphate, the steps consisting in first producing a normal super-phosphate by subjecting the phosphate-of-lime-containing material to the action of sulphuric acid, then mixing the mass with about two parts of water to one of material, then separating the liquid from the mass and evaporating it, then mixing with the product a second body of phosphate-of-lime-containing material, and withdrawing the resultant mass and separating the liquid therefrom.

2. In the manufacture of super-phosphate, the steps consisting in mixing the pulverized phosphate-containing material with concentrated sulphuric acid, allowing the mass to become homogeneous, mixing the mass with water, allowing the solid portions to settle, withdrawing the liquid from the mixer, evaporating the same to about 20° Baumé, then mixing about fifty per cent. of fresh phosphate-of-lime-containing material, withdrawing the resultant mass and separating the liquid therefrom, returning the separated liquid and evaporating it to from 85° to 95° of strength, and then mixing therewith about fifty per cent. of phosphate-of-lime-containing material to form a dry high-grade super-phosphate.

In witness whereof I have hereunto set my hand.

HEINRICH SAXL.

Witnesses:
S. H. NOURSE,
JESSIE C. BRODIE.